(12) United States Patent
Arbuckle et al.

(10) Patent No.: US 9,332,778 B2
(45) Date of Patent: May 10, 2016

(54) SYSTEM AND METHOD FOR WEIGHT MANAGEMENT

(75) Inventors: John F. Arbuckle, Arundel (AU); Kelly Arbuckle, Arundel (AU)

(73) Assignee: JF ARBUCKLE MEDICAL PTY LTD., Arundel, Queensland (AU)

( * ) Notice: Subject to any disclaimer, the term of this patent is extended or adjusted under 35 U.S.C. 154(b) by 809 days.

(21) Appl. No.: 13/263,091

(22) PCT Filed: Apr. 6, 2010

(86) PCT No.: PCT/AU2010/000389
§ 371 (c)(1),
(2), (4) Date: Oct. 6, 2011

(87) PCT Pub. No.: WO2010/115236
PCT Pub. Date: Oct. 14, 2010

(65) Prior Publication Data
US 2012/0021388 A1 Jan. 26, 2012

Related U.S. Application Data

(60) Provisional application No. 61/167,126, filed on Apr. 6, 2009.

(51) Int. Cl.
*G09B 19/00* (2006.01)
*A47G 19/00* (2006.01)
*A47G 19/02* (2006.01)
*A23L 1/29* (2006.01)

(52) U.S. Cl.
CPC ............... *A23L 1/293* (2013.01); *A47G 19/025* (2013.01); *A23V 2002/00* (2013.01)

(58) Field of Classification Search
USPC .......................................... 434/127; 220/574
See application file for complete search history.

(56) References Cited

U.S. PATENT DOCUMENTS

| 5,817,006 | A | * | 10/1998 | Bergh et al. | .................... | 600/300 |
| 5,908,301 | A | * | 6/1999 | Lutz | .............................. | 434/236 |
| 6,075,755 | A | | 6/2000 | Zarchan | | |
| 6,558,165 | B1 | * | 5/2003 | Curry et al. | .................... | 434/236 |

(Continued)

FOREIGN PATENT DOCUMENTS

WO  WO 96/02183 A1  2/1996
WO  WO 2005/002430 A1  1/2005

OTHER PUBLICATIONS

"GI Diet Plan: Guide to GI Eating Habits". Apr. 26, 2006. Retreived Sep. 25, 2013 from <URL: http://web.archive.org/web/20060426061236/http://www.carbs-information.com/gi-diet-plan.htm>.*

(Continued)

*Primary Examiner* — Sam Yao
*Assistant Examiner* — Peter J Alley
(74) *Attorney, Agent, or Firm* — Buchanan Ingersoll & Rooney PC

(57) ABSTRACT

A system and method for weight management and loss is provided. The system and method regulate the quantity and constitution of the food and the system and method regulate the speed at which a meal is consumed so as to trigger a natural satiety response. In one aspect of the invention there is provided a timer (11) adapted to communicate with a subject during a meal over a predetermined time interval, whereon the subject in response to the timer completes the meal on or after the expiry of said predetermined time interval.

30 Claims, 6 Drawing Sheets

(56) References Cited

U.S. PATENT DOCUMENTS

| | | | |
|---|---|---|---|
| 6,560,165 B1 | 5/2003 | Barker | |
| 2003/0065257 A1* | 4/2003 | Mault et al. | 600/407 |
| 2008/0019122 A1* | 1/2008 | Kramer | 362/154 |
| 2008/0200239 A1* | 8/2008 | Gilmore et al. | 463/22 |
| 2010/0240962 A1* | 9/2010 | Contant | 600/300 |

OTHER PUBLICATIONS

International Search Report corresponding to PCT/AU 2010/000389 issued on May 27, 2010.

Written Opinion corresponding to PCT/AU2010/000389 issued on May 27, 2010.

* cited by examiner

SYSTEM AND METHOD FOR WEIGHT MANAGEMENT

CROSS-REFERENCE TO PRIOR APPLICATIONS

This application claims priority under 35 U.S.C. §120 of U.S. Provisional Application No. 61/167,126, filed Apr. 6, 2009, and is the U.S. National Stage of PCT/AU2010/000389, filed Apr. 6, 2010 and designating the United States on Oct. 14, 2010, as WO 2010/115236 A1, each hereby expressly incorporated by reference in its entirety and each assigned to the assignee hereof.

BACKGROUND OF THE INVENTION

1. Field of the Invention

The present invention relates to a system and method for weight management. In particular although not exclusively the present invention is directed to a system and method for controlling the speed at which a meal is consumed so as to trigger a natural satiety response.

2. Discussion of the Background Art

Various experts are quoted as saying that over 50% of the Western World's population is overweight or obese. Certain population groupings within the whole, particularly children, are at greater risk of both psychological and physiological morbidity. There are many contributing factors to this phenomenon such as non-compulsory physical education at schools, video games etc, however, the main suspect is the modern diet and the way in which meal time is conceived by modern society. Portion sizes have doubled and often tripled over the past 30 years. Some "foods" are only partially recognised as such by our physiological cues. Meal time, which was once a landmark in the day, looked forward to by family members, is now becoming no more than a quick refuelling stop often conducted in front of the TV or at a work desk.

The natural hunger-satiety system works in a simple way in that when we are hungry we seek food and we eat it. From the time we start to eat we release Peptide Satiety Hormones (amongst other responses) in an escalating cascade which floods into our blood stream to be read and de-coded by satiety centres in the Hypothalamus of our brains. Once the hormones reach a critical level the Hypothalamus then triggers the cerebral messages of satiety. This whole process culminates in around 17-20 minutes. Recent research shows that modern human eating behaviours, including the nature of the food and the speed at which we eat it, causes the satiety cascade to be bypassed and over-ridden and eventually blunted. This results in a person often over indulging at meal times, as the sensation of fullness is registered, if at all, only after a vast amount of calories have been consumed.

Clearly, it would be advantageous to provide a system and method that would assist in the management of a subject's weight by ensuring that the natural satiety response is not bypassed during the consumption of a meal. It would also be advantageous to provide a system and method which would assist in the retraining of the eating habits of a subject in order to elicit the natural satiety response.

SUMMARY OF THE INVENTION

Disclosure of the Invention

In one aspect of the present invention, there is provided a method for training of a subject's satiety response during the consumption of a meal said method comprising the steps of:

initiating a timer, the timer operating over a predetermined time interval; and triggering the subject's satiety response by having the subject consume the meal over the predetermined time interval such that the meal is completed on or after expiry of the predetermined time interval.

In another aspect of the present invention, there is provided a system for assisting in triggering a subject's satiety response during the consumption of a meal, said system comprising:

a timer adapted to operate over a predetermined time interval, said timer adapted to communicate with the subject whereon the subject in response to the timer completes the meal on or after the expiry of said predetermined time interval.

Suitably, the timer could be incorporated into a functional base which is adapted to receive a serving dish such as a plate or other suitable servery platform. The timer may include a display for indicating the amount of elapsed time within the predetermined time period and/or designated eating and resting intervals within the predetermined time period to the subject. The display could include a series of flashing lights, LCD display or other suitable visual indicator. The display may include at least one LED to indicate the amount of elapsed time within the period.

Preferably the LED is scanned across the display between a start and end position throughout the duration of the predetermined time period. Suitably the LED is scanned between the start and end positions at a rate of approximately 20 to 30 seconds. The designated eating interval is preferably between 1 to 3 minutes in duration. Suitably the designated resting interval is between 1 to 2 minutes. The LED may change its display colour during the designated eating and resting intervals for example the LED could change from green to red to provide a further visual reference that a designated rest interval has commenced.

Where the display is in the form of a LCD the timer could be programmed to provide additional information to the subject for example motivational messages, feed back information on the rate of consumption for example advising the subject that he/she should have consumed so much of the meal by a given marker within the predetermined period if they are to complete the meal within or on expiry of the predetermined time period.

The timer may also include an audible alarm, such as a tone generator, beeper, buzzer, voice synthesizer or the like. In the case where the timer includes a voice synthetiser the timer may be adapted to provide a series of messages regarding the subject's progress, and one or more motivational messages including messages like "enjoy your meal", "have a break", "please resume your meal", "you may complete your meal", "well done for completing your meal slowly" or the like.

Suitably the predetermined time interval may be about 10 to 17 minutes, 15 to 22 minutes, 15 to 20 minutes, 17 to 20 minutes, 18 to 20 minutes, 16 to 22 minutes, 17 to 22 minutes. Most preferably the predetermined time interval is in the order of 18 minutes in duration.

The timer may be adapted to receive data regarding various attributes of the subject, such as the subject's weight, height, age, gender or the like. The timer may be configured to adjust the predetermined time interval based on the received data.

Suitably the system and method may further include the usage of an assortment of cutlery, crockery, glassware or the like. The cutlery, crockery, glassware may be designed to further assist in weight loss by controlling the portion size of different food types consumed by the subject. For example the crockery and glassware may be provided with markings to indicate recommended portion sizes, while the cutlery may be appropriately sized to limit the amount of food which it can carry i.e. cutlery is sized to limit amount of food in any given mouthful taken by the subject.

To further assist with portion control the functional base may include a weighing mechanism, such as a set of scales for weighing the servery platform when loaded. Weighing the servery platform in this manner ensure that the meal does not exceed a given weight. This further reduces the risk of a subject over-consuming heavy, dense (therefore high calorie) foods. Suitably the weight of the loaded servery platform is displayed on the timer's display. Alternatively weight of the loaded servery platform could be displayed on a dedicated display housed within the functional base.

In the case where the system and method utilises an assortment of cutlery, crockery, glassware or the like, the timer may be incorporated within any one of these implements. For example the timer could be integrated within the body of a plate, glass or other suitable servery apparatus.

The system and method may also incorporate the use of a snack box, which enables a subject to have a snack such as a chocolate bar etc, during certain recognised danger times e.g. between 3 to 4 pm in the afternoon without exceeding their recommended daily calorific intake. Suitably the snack box is sized to provide a snack between 100-200 calories.

The system may include the use of a portable timer. Suitably the portable timer is adapted to be attached to a lanyard, key ring, keychain or the like. The portable timer may include a display for indicating the amount of elapsed time within the predetermined time period and/or designated eating and resting intervals within the predetermined time period to the subject. The display may include a series of flashing lights, LCD display or other suitable visual indicator.

The display on the portable timer may include at least one LED to indicate the amount of elapsed time within the period. Preferably the LED is scanned across the display between a start and end position throughout the duration of the predetermined time period. Suitably the LED is scanned between the start and end positions at a rate of approximately 20 to 30 seconds. The designated eating interval is preferably between 1.5 to 3 minutes in duration. Suitably the designated resting interval is between 1 to 2 minutes. The LED may change its display colour during the designated eating and resting intervals for example the LED could change from green to red to provide a further visual reference that designated rest interval has commenced.

Where the portable timer includes an LCD display the portable timer could be programmed to provide additional information to the subject for example motivational messages, feed back information on the rate of consumption for example advising the subject that he/she should have consumed so much of the meal by a given marker within the predetermined period if they are to complete the meal within or on expiry of the predetermined time period.

The portable timer may also include an audible alarm, such as a tone generator, beeper, buzzer, voice synthesizer or the like. In the case where the timer includes a voice synthetiser the timer may be adapted to provide a series of message regarding the subject progress, and one or more motivational messages including messages like "enjoy your meal", "have a break", "please resume your meal", "you may complete your meal", "well done for completing your meal slowly" or the like.

In the case where the portable timer includes an audible alarm specific sounds such as a beeping sound to alert different instructions to the subject. For example, a specific beep could be used once the timer is pressed at the beginning of a meal while a different beep is used at the end of a predetermined time interval instructing the subject that the meal or drink may be completely consumed. Specific beeps could also be used to alert the subject when to eat or drink, when to pause or rest from consumption and then when to resume eating or drinking again encouraging the subject to consume the meal or beverage at a reduced rate.

The portable timer may be adapted to receive data regarding various attributes the subject, such as the subject's weight, height, age, gender or the like. The portable timer may be configured to adjust the predetermined time interval based on the received data.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

Figure 1A:
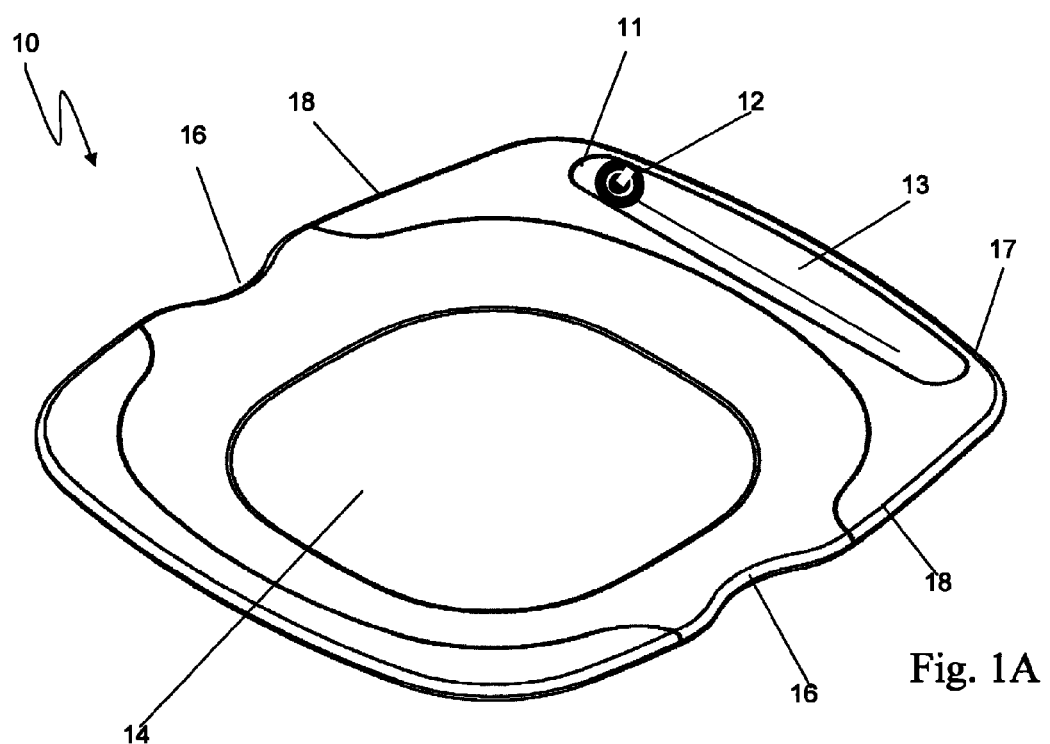
FIG. 1A is a top right perspective view of a functional base for crockery according to one embodiment of the invention.

With reference to FIG. 1, there is illustrated a functional base for crockery 10 according to one embodiment of the present invention. The functional base 10 as shown in this particular example houses timer 11, the timer 11 includes a start button 12 and display 13.

The functional base 10 in this instance designed to receive a serving dish such as that shown in FIG. 3 for example which is discussed in greater detail below. In this particular example, the functional base 10 includes depression 14 for receipt of the bottom of a serving dish. The functional base 10 may further include indentations 16 disposed on the longitudinal edges 18 of the functional base 10. The indentations 16 are designed to allow the serving dish to be readily removed from depression 14, the indentations 16 permit a subject to easily position their fingers on the underside of the serving dish so as to provide sufficient leverage to lift the dish free of the depression 14. The functional base 10 may include a weighing mechanism, such as a set of scales, disposed within the base of the depression 14 for weighing the servery platform when loaded. In such instances the weight of the loaded servery platform may then be displayed on the display 13 or on a spate dedicated display.

Figure 1B:
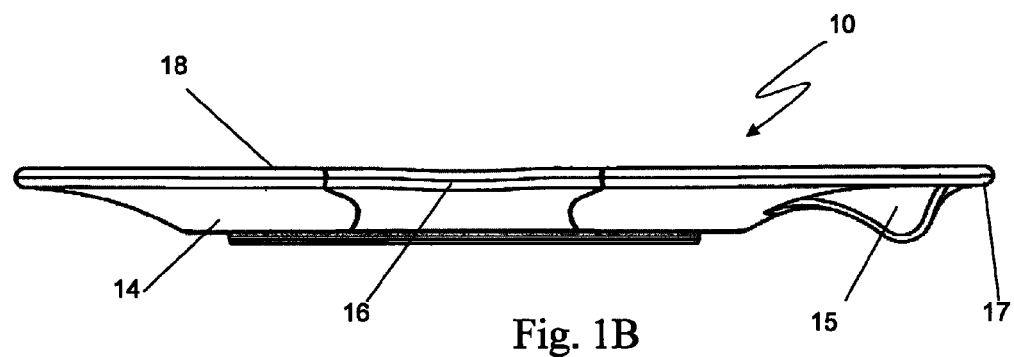
FIG. 1B is a right side elevation of the functional base for crockery of FIG. 1A FIGS. 2A to 2C depict the operation of a timer according to one embodiment of the present invention disposed within the functional base FIGS. 1A and 1B.

The timer 11 as shown in FIG. 1B is powered by a battery disposed in a compartment 15 beneath the display 13, the compartment 15 substantially spans the length of the upper lateral edge 17 of the functional base 10. While the timer 11 as shown in FIGS. 1A and 1B is battery powered it will be appreciated by those of skill in the art that the timer could be powered by any number of arrangements such as a solar cell, mains power adaptor or the like.

Figure 2A:
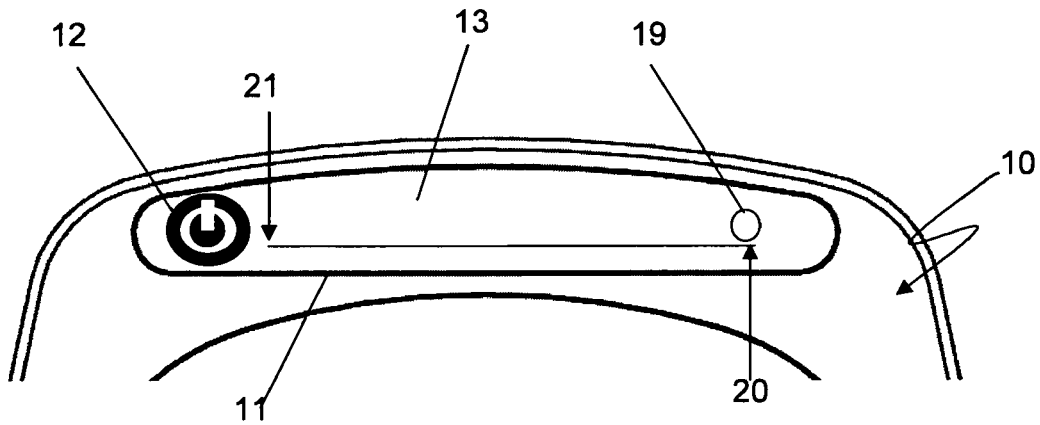
Figure 2B:
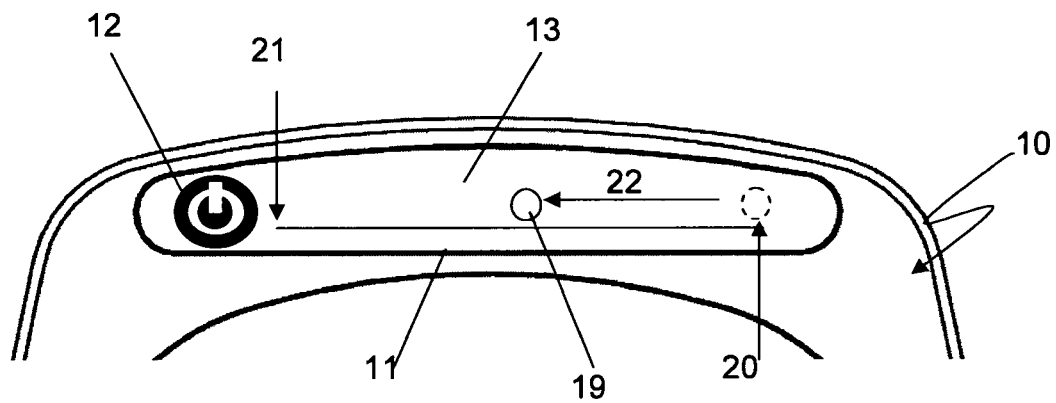
Figure 2C:
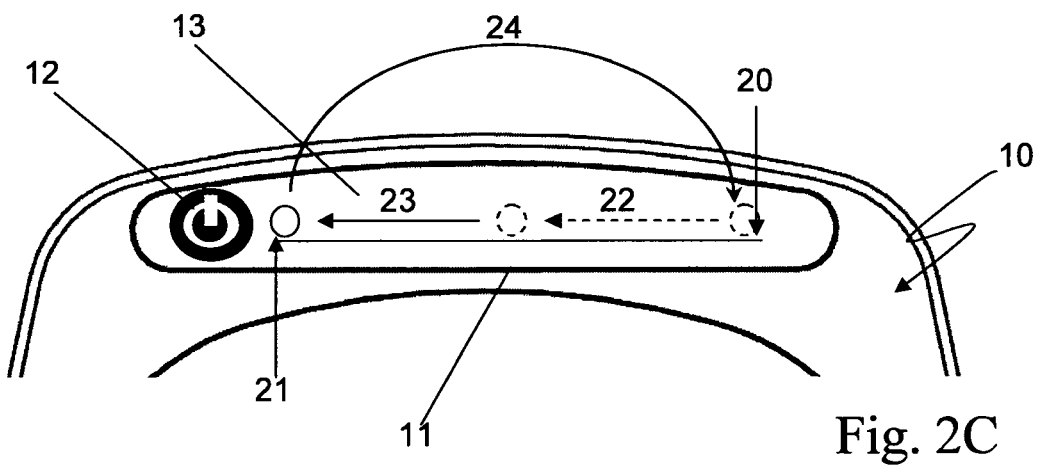

The operation of the timer 11 is shown in greater detail in FIGS. 2A, 2B and 2C. As shown in FIG. 2A the timer 11 is initiated by pressing the start button 12 on commencement of a meal. On initiation of the timer 11, an LED 19 is illuminated within the display 13. The LED 19 in this instance is utilised to indicate the amount of elapsed time since commencement of the predetermined time period loaded into the timer 11. As shown in FIG. 2B the LED 19 is scanned from its staring position 20 across the display 13, as denoted by arrows 22, 23, toward an end position 21 (as shown in FIG. 2C). On reaching the end position 21 the LED 19 is reset to the starting position 20, as indicated by arrow 24. The LED 19 is continually scanned across the display in this manner until the expiry of the predetermined time period. In the example shown in FIGS. 2A-2C the LED 19 is scanned across the display every 20 to 30 seconds (i.e. approximately the time taken to complete a mouthful of food) until the expiry of the predetermined time period whereon the timer automatically powers down.

In one embodiment of the invention, the timer 11 may be adapted to scan the LED 19 for a preset interval within the predetermined time period. On expiry of the preset interval the progress of the LED 19 is paused for designated rest interval. During the designated rest interval the LED 19 may change its display colour for example from green to red to provide a further visual reference that designated rest interval has commenced. These intermittent scan and rest periods are then continued until the expiry of the predetermined time period.

It will of course be appreciated by those of ordinary skill that the indicator need not be an LED 19 and that the display 13 could be a series of flashing lights, LCD display or other suitable visual indicator. Where the display is in the form of a LCD the timer could be programmed to provide additional information to the subject for example motivational messages, feed back information on the rate of consumption for example advising the subject that he/she should have consumed so much of the meal by a given marker within the predetermined period if they are to complete the meal within or on expiry of the predetermined time period.

While the exemplary timer shown in FIGS. 1A to 2C utilises a visual display 13 to provide feedback to the subject, it will be appreciated by those of ordinary skill in the art that an audible alarm system could be utilised instead of or in conjunction with such a visual timing reference. For example the timer 11 could include a speaker for the provision of an audible alarm to the subject. Different audible tones could be used to convey different instructions to the subject, for instance a specific beep could be used to indicate the initialisation of the timer 11 while another could be used to signal the expiry of the predetermined time period. Other tones could be used to signify different event which a subject when to eat or drink, when to pause or rest from consumption and then when to resume consumption.

In one embodiment, the audible alarms could be in the form of a synthesised voice providing the subject with different instructions during various points the consumption of a meal. For example, once the start button 12 is pressed, the speaker could sound "enjoy your meal". Messages such as "have a break" or "please resume your meal" could then be utilised to denote the commencement and expiry of the designated eating and rest intervals. This cycle of eating and then resting may then be continued until the expiry of the predetermined time period. On completion of the predetermined time period message such as "you may complete your meal" or "well done for completing your meal slowly" could be provided to the subject in an effort to positively reinforce the behaviour of slowing their meal consumption.

As previously mentioned the size of portions consumed by a subject is one of the major factors in weight gain. In view of this the applicant has designed a series of tableware for use with the functional base which assist the subject in portion control. A selection of this tableware is discussed in greater detail below.

Figure 3:
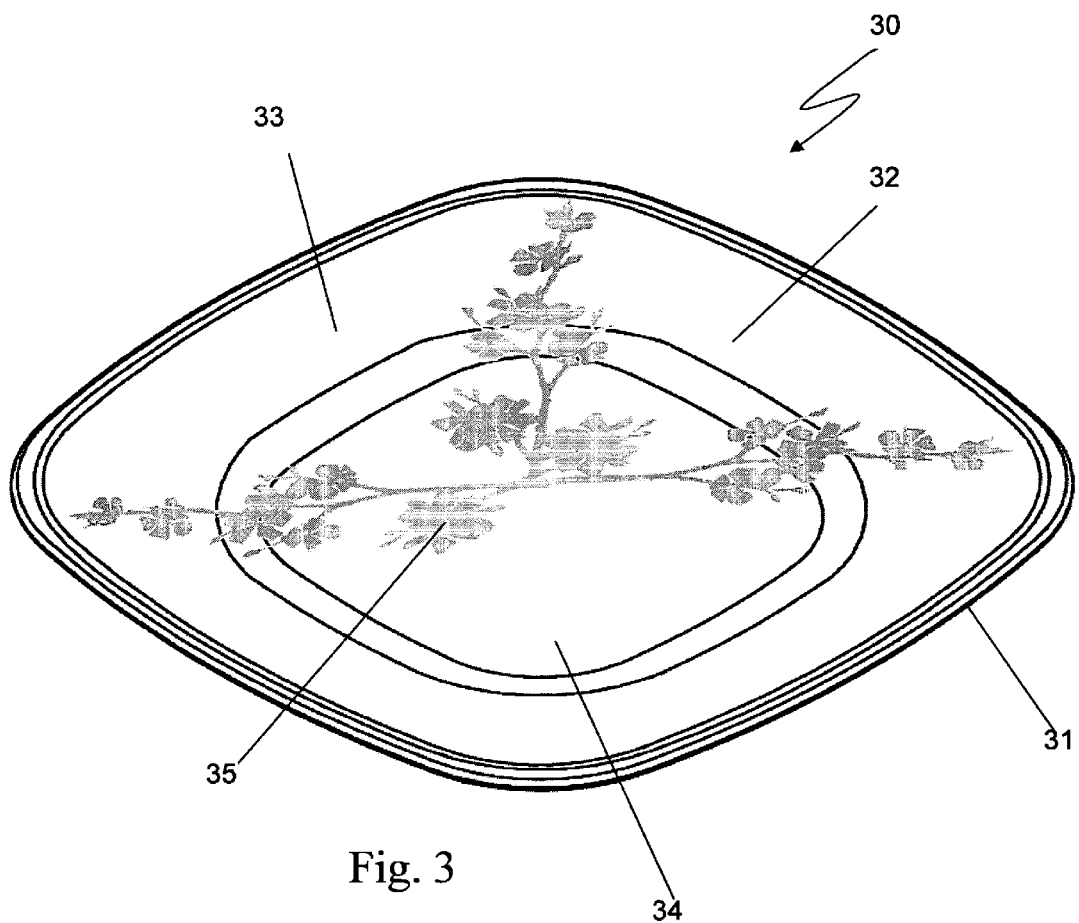
FIG. 3 is a perspective view of a serving dish for use with the functional base of FIGS. 1A and 1B.

FIG. 3 illustrates one possible configuration for a serving dish 30 for use with the functional base 10. The serving dish 30 in this instance is in the form of a plate 31 which is divided into a plurality of segments 32, 33, 34. In this case the division of the plate 31 is via the use of a floral motive 35. Each of the segments is assigned a specific food group such as meat/protein in segment 32, complex carbohydrates in segment 33, and vegetables/salad in segment 34. Each section is so sized that the serving of the food per grouping meets the minimum dietary requirement for an average subject within three main population groupings adult males, adult females and children. In each case the plate is designed to apportion each of the main food groups on a volumetric basis, segment 34, the vegetables/salad segment, contributes to 50% of the meal by volume, while the complex carbohydrates section 33 is sized such that it contributes 25% of the meal by volume and finally the meat/protein section 32 provides 25% of the meal by volume.

Figure 4:
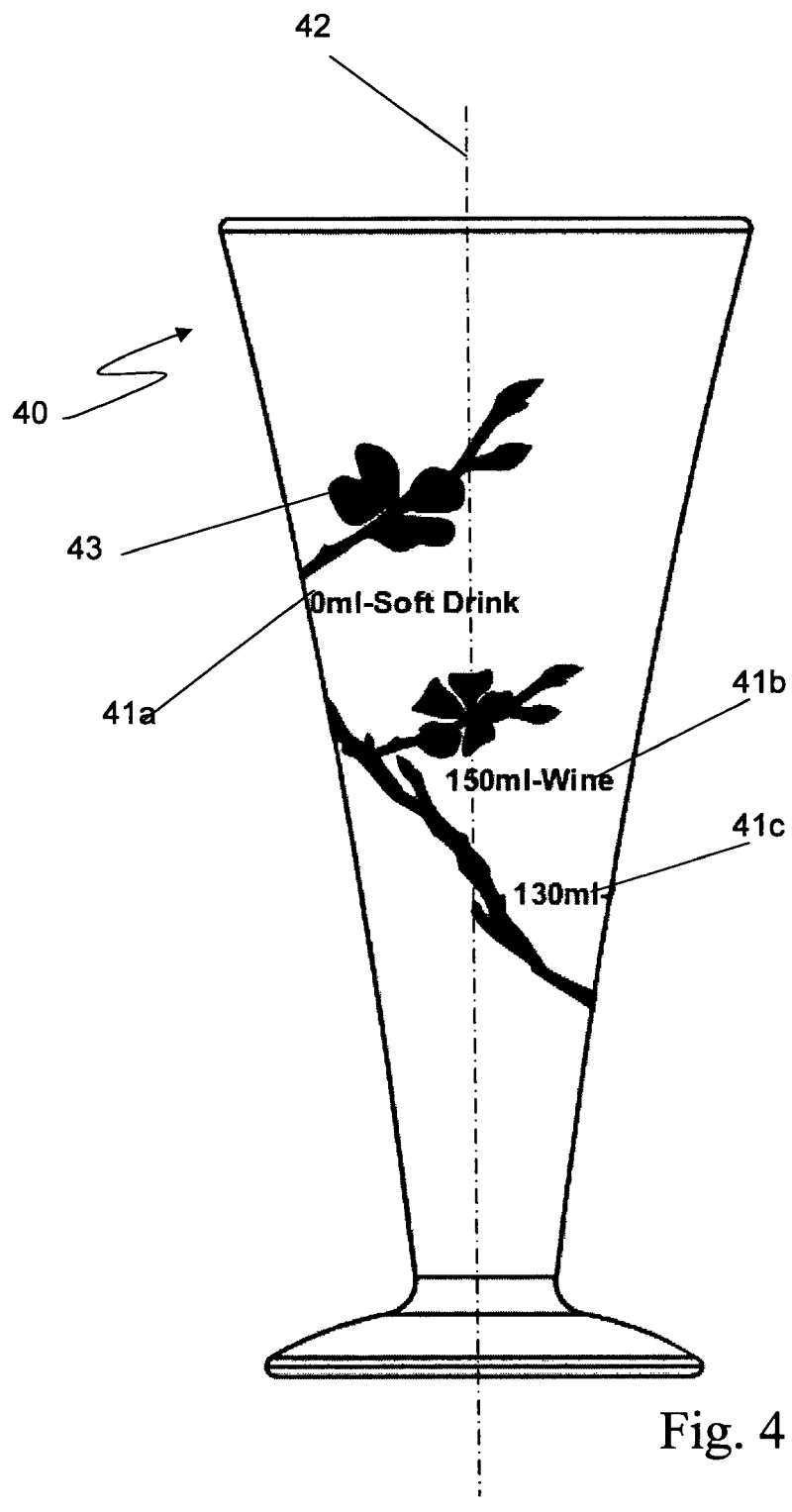
FIG. 4 depicts one embodiment of a drinking vessel for use in the weight management system of the present invention.

With reference to FIG. 4 there is depicted a glass 40 to assist a subject with measuring the appropriate volumetric serving of a given beverage. As shown the glass 40 includes a series of markings 41a, 41b, 41c indicating recommended serving of different beverages. In the present example the markings the markings are disposed at different heights along the vertical axis 42 of the glass 40. The marking in this instance form part of a floral pattern 35 disposed on the outer surface of the glass 40. As shown the markings are disposed such that they spiral upwardly along the vertical axis of the glass 40 so as to reduce the likelihood of overlap between the markings.

Figure 5:
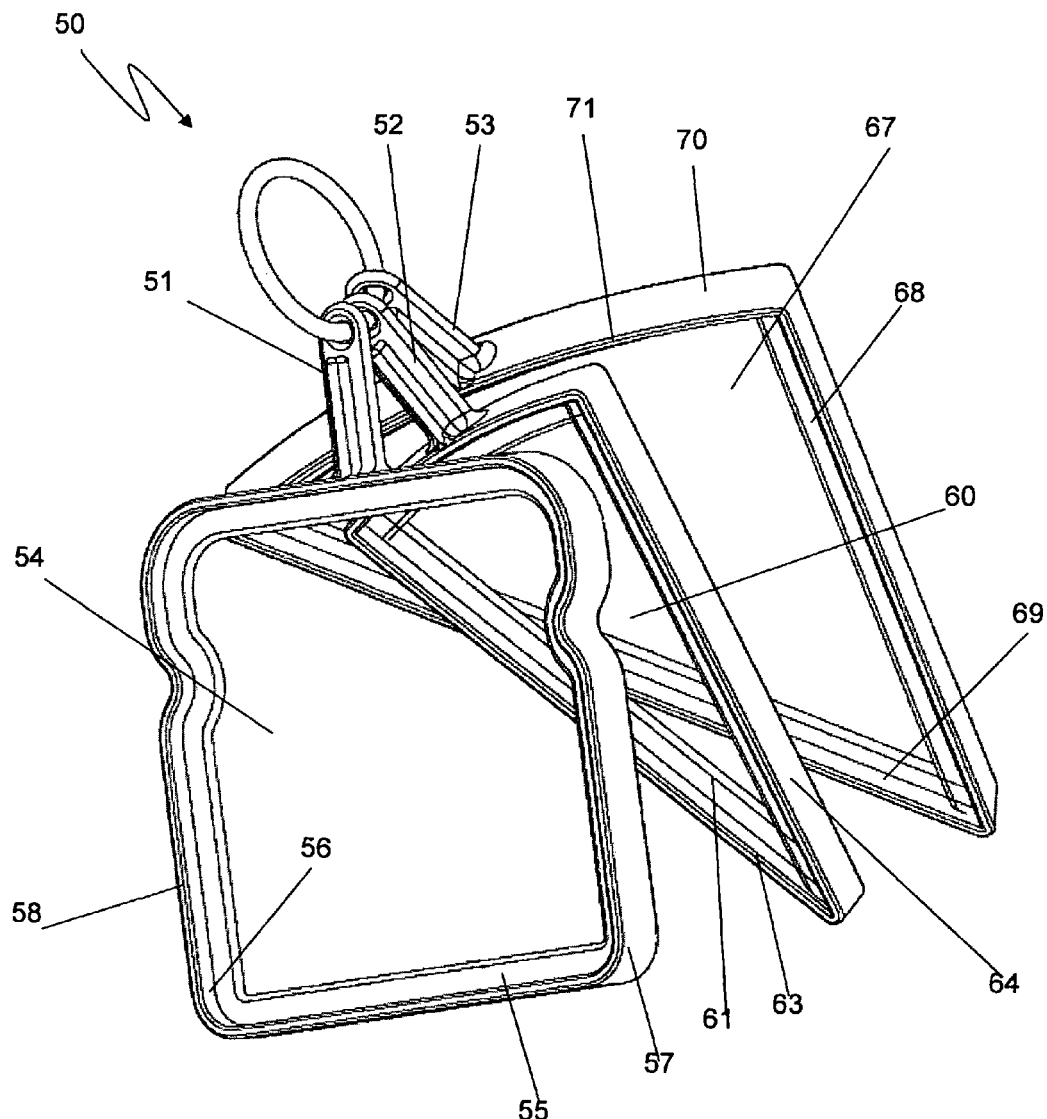
FIG. 5 is a perspective view of one embodiment of a set of baked product templates for use in the in the weight management system of the present invention.

FIG. 5 illustrates a set of baked product size templates 50 for measuring a standard serving of a given baked item such as bread, cake or pizza. In the present example, there is provided a template for measuring a serving of bread 51, a piece of cake 52 and a slice of pizza 53. The bread template 51 includes a central aperture 54, a flange 55 extends into central aperture 54 and about the internal surface 56 of the periphery 57 of the template 51. To cut the appropriate portion of bread the template 51 is placed over a piece of bread such that the upper edge 58 of the periphery 57 rest on the surface of the piece of bread. The template 51 is then pressed down until the flange 55 abuts the surface of the piece of bread causing the upper edge 58 of the periphery 57 to indent the piece of bread. The appropriately sized serving of bread can then be cut to appropriate size.

The cake template 52 as shown includes a central aperture 60 a flange 61 extends into central aperture 62 and about the internal surface 63 of the periphery 64 of the template 59. In operation the template 52 is place onto the surface of the cake such that the upper surface 65 of the periphery 64 engages the surface of the cake. The template 52 is then removed from the cake's surface, resulting in an impression of the template being left in the surface of the cake. The impression of the upper surface 65 of the periphery 64 produces two channels which can be then used as a guide by the subject to cut the cake to the appropriate serving size.

The pizza template 53 works in a similar manner to that of the cake template 52. As with the cake template 52 the pizza template 53 includes a central aperture 67 into which extends flange 68 into central aperture 67 and about the internal surface 69 of the periphery 70 of the template 66. As with the cake template the pizza template upper surface 71 of the periphery 70 engages the surface of the pizza leaving an impression of the template therein. The impression then acts as a guide for the subject to cut the appropriate serving size.

In one embodiment of the present invention there is provided a system for assisting the cognitive retraining of a subject's satiety response. The system in this particular case makes use of the combination of the functional base 10 and the series of tableware discussed above in relation to FIGS. 3 to 5. The operation of the system varies slightly between the three main target population groups, namely adult males, adult females and children as each of these groups have different dietary needs.

In order to effect training of the satiety response a subject is firstly required to prepare a meal based on the preset serving sizes set out on the plate 31 namely 50% of the meal by volume being composed of vegetables/salad, 25% of the meal by volume being complex carbohydrates and finally 25% of the meal by volume being protein. The plate may then be weighed on a suitable set of scales as a further control on the constitution of the food. Alternatively the scales may be incorporated into the functional base 10, with the weight of the loaded plate being displayed to the subject via the display 13. By weighing the loaded plate over-consumption of heavy, dense (therefore high calorie) foods can be further reduced.

Weight allowances have been researched and are determined by sex, age and activity levels. In this particular example of the system the plate is designed to provide about 450 to 550 calories for the average adult male, 400 to 500 calories for an average adult female, and appropriately determined calories for a child per meal. The use of the glassware to measure the appropriate serving of the subject's desired beverage also ensures that the amount of additional calories from for example soft drinks is limited. Likewise with the cake, bread and pizza templates use of these items also ensure that the appropriate portions are eaten without adding unnecessary calories. The system may also include a 100-200 calorie snack box, which enables a subject to have a snack such as a chocolate bar etc during certain recognised danger times e.g. between 3 to 4 pm in the afternoon.

Use of the tableware should ensure an average daily calorie intake of 1800-2000 calories a day for adult men and around 1300-1500 calories a day for women. Children's needs being calculated as per research. Of course it will be appreciated by those of ordinary skill in the art that these intakes are merely a guide and the caloric intake for various demographics within the population groups will need to be adjusted, based on a number of factors, such as the individual's level of activity etc.

Once the meal has been placed onto the serving dish 30 and appropriately weighed the subject is then required to position the serving dish within the depression 14 of the functional base 10. The subject then initiates the timer 11 via start button 12. The timer 11 then counts down the time remaining in the predetermined time period. This information is then provided to the subject via display 13. The subject is then encouraged to consume the meal over the predetermined time period. The predetermined time period may be set for example between 15 to 22 minutes.

Assuming that the timer is set for a period of 17 minutes i.e. subject is consuming a main meal, the timer for the first five minutes may instruct the subject to consume mainly vegetables or salad, to assist in the development of the feeling of fullness before they have consumed too many calories. By utilising having the subject interact with the timer the system regulates the subject's rate of consumption to ensure that the meal is not completed before the subject natural satiety system is triggered. Continual usage of the system retrains the subject's satiety mechanisms from the release of satiety peptides to their recognition by the brain. Prolonged use of the system should lead to a regularization of the portion size and speed of eating to take maximum advantage of the natural satiety response.

To further aid the subject with the use of the system an instructional booklet is provided. The booklet includes a set of instructions on the usage of the timer and provides further information to the subject on how best to interact with the timer to produce the optimal weight loss and management results. The booklet also includes appropriate educational material on nutrition and diet.

Figure 6:
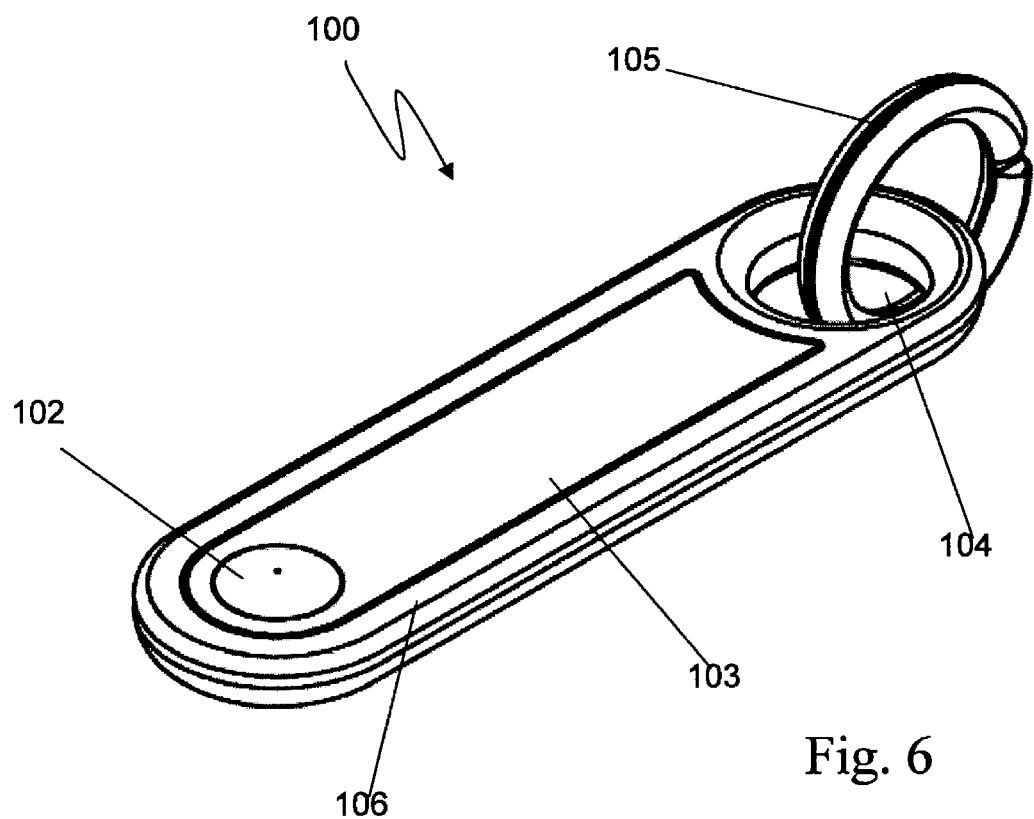
FIG. 6 is a perspective view of a portable timer according to one embodiment of the present invention.

The above system has been discussed in relation to the use of a functional base 10. The applicant realises, however, that it is not always practical to transport the functional base between various locations. Accordingly, the applicant has devised a portable timer 100 one example of which is illustrated in FIG. 6. The timer 100 in this instance includes an elongate body 106 having an aperture 104 disposed at one end. The aperture 104 allows the timer 100 to be readily attached to a lanyard, key ring 105 (as shown), key chain or the like.

As with the timer 11 within the functional base 10, the portable timer 100 is initiated at the beginning of the consumption of a meal, via start button 102. The timer 100 then beings to count down a predetermined time period, the status of the countdown being displayed to the subject via display 103. As the timer 100 is readily portable the subject has ready access to the timer 100 for use in the event of eating or drinking out on short notice for example dining out etc.

The timer 100 may also include an audible alarm which could be utilised instead of or in conjunction with the display. For example the timer could include a speaker for the provision of an audible alarm to the subject. Different audible tones could be used to convey different instructions to the subject, for instance a specific beep could be used to indicate the initialisation of the timer 100 while another could be used to signal the expiry of the predetermined time period. Other tones could be used to signify different events such as when the subject is to eat or drink, pause or rest from consumption and then when to resume consumption.

In regulating quantity, constitution and speed of eating as exemplified in the above discussion the system and method of the present invention attempts to control proven important dietary variables in weight management and nutrition as well as acting as a cognitive behavioural educator in long term weight control.

One advantage of the present system and method is that it enables a subject to begin to distinguish between true physical hunger and psychological need by listening to physiological cues. It also advantageously allows a subject to control their eating style and prolonged usage eventually conditions the subject to consume meals at a steady rate in order to properly register satiety. A user will also become used to eating specific amounts of food and a variety of food types all leading to improved health and weight management.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A method for assisting in the retraining of the stimulation of a subject's satiety response during the consumption of a meal over a predetermined time period, said method comprising the steps of:
   measuring a meal size by weight to ensure that the meal does not exceed a maximum weight based on a subject's gender;
   advising the subject if the meal exceeds the maximum weight permitted for the subject's gender;
   initiating a timer on determining that the meal is the appropriate size, said timer adapted to operate over a predetermined time interval;
   conveying an instruction, via the timer issuing a signal of a first type to the subject to consume a portion of the meal over an eating interval;
   conveying an instruction, via the timer issuing a signal of a second type different to the first type, to the subject to pause consumption of the meal over a resting interval, wherein the eating and resting intervals are continually alternated over the predetermined time interval to trigger said subject's satiety response by having the subject complete the meal on or after expiry of said predetermined time interval with the subject signalled over the predetermined time interval to either consume or rest by the issuance of the signal of the first type and the signal of the second type alternated over the predetermined time interval;
   signalling the end of the predetermined time interval to the subject at the end of the predetermined time interval; and
   communicating the eating and resting intervals to the subject via a visual display, wherein the display comprises at least one LED to indicate the amount of elapsed time within the predetermined time interval, and the LED is scanned across the display between a start and end position throughout the duration of the predetermined time interval.

2. The method of claim 1, further comprising: communicating the eating and resting intervals to the subject via an audible source.

3. The method of claim 2, wherein the audible source comprises a series of tones each tone within the series denoting an eating or resting interval.

4. The method of claim 2, wherein the audible source comprises a voice synthesizer, the voice synthesizer being configured to deliver a set of messages delimitating the eating and/or resting intervals.

5. The method of claim 1, wherein the LED is scanned between the start and end positions at a rate of approximately 20 to 30 seconds.

6. The method of claim 1, wherein the eating interval is approximately 2 to 3 minutes in duration.

7. The method of claim 1, wherein the resting interval is approximately 1 to 2 minutes in duration.

8. The method of claim 1, wherein the step of measuring the meal size comprises segregating food groupings within the meal.

9. The method of claim 8, wherein the food groups comprising the meal include vegetables, complex carbohydrates and protein on a volumetric basis.

10. The method of claim 9, wherein 50% of the meal by volume is from the vegetable group, 25% of the meal by volume is from the complex carbohydrates group and 25% of the meal by volume is from the protein group.

11. The method of claim 1, further comprising measuring meal portion size.

12. The method of claim 11, wherein measuring portion size comprises segregating food groupings within the meal.

13. The method of claim 12, wherein the food groups comprising the meal include vegetables, complex carbohydrates and protein on a volumetric basis.

14. The method of claim 13, wherein 50% of the meal by volume is from the vegetable group, 25% of the meal by volume is from the complex carbohydrates group and 25% of the meal by volume is from the protein group.

15. The method of claim 11, wherein measuring meal portions further comprises:
   weighing the amount of food to be consumed.

16. The method of claim 1, wherein said predetermined time interval is approximately 15 to 22 minutes.

17. The method of claim 16, wherein said predetermined time interval is 18 minutes.

18. A system for assisting in triggering a subject's satiety response during the consumption of a meal over a predetermined time period, said system comprising:
   a timer adapted to operate over a predetermined time interval, said timer including a visual and/or audio indicator adapted to:
      convey an instruction to the subject to consume a portion of the meal over an eating interval by issuing a signal of a first type;
      convey an instruction to the subject to pause consumption of the meal over a resting interval issuing a signal of a second type different to the first type;
      alternate the eating and resting intervals continually over the predetermined time interval to cause the subject to complete the meal on or after the expiry of said predetermined time interval with the subjected signalled over the predetermined time interval to either consume or rest by the issuance of the signal of the first type and the signal of the second type alternated over the predetermined time interval; and
      signal the end of the predetermined time interval to the subject at the end of the predetermined time interval; and
   wherein the eating and resting intervals are communicated to the subject via a visual display, wherein the display comprises at least one LED to indicate the amount of elapsed time within the predetermined time interval, and the LED is scanned across the display between a start and end position throughout the duration of the predetermined time interval.

19. The system of claim 18, wherein the eating and resting intervals are further communicated to the subject via an audible source.

20. The system of claim 19, wherein the audible source comprises a series of tones each tone within the series denoting an eating and/or resting interval.

21. The system of claim 19, wherein the audible source comprises a voice synthesizer, the voice synthesizer being configured to deliver a set of messages delimitating the eating and/or resting intervals.

22. The system of claim 18, wherein the LED is scanned between the start and end positions at a rate of approximately 20 to 30 seconds.

23. The method of claim 18, wherein the eating interval is approximately 2 to 3 minutes in duration.

24. The method of claim 18, wherein the resting interval is approximately 1 to 2 minutes in duration.

25. The system of claim 18, wherein said predetermined time interval is approximately 15 to 22 minutes.

26. The system of claim 25, wherein said predetermined time interval is 18 minutes.

27. A timer for assisting in triggering a stimulation of a subject's satiety response during a consumption of a meal over a predetermined time period, said timer comprising:
   a visual and/or audio indicator adapted to:
      convey an instruction to the subject to consume a portion of the meal over an eating interval by issuing a signal of a first type;
      convey an instruction to the subject to pause consumption of the meal over a resting interval issuing a signal of a second type different to the first type;
      alternate the eating and resting intervals continually over the predetermined time interval to cause the subject to complete the meal on or after the expiry of said predetermined time interval with the subjected signalled over the predetermined time interval to either consume or rest by the issuance of the signal of the first type and the signal of the second type alternated over the predetermined time interval; and
      signal the end of the predetermined time interval to the subject at the end of the predetermined time interval; and
   wherein the eating and resting intervals are communicated to the subject via a visual display, wherein the visual display comprises at least one LED to indicate the amount of elapsed time within the predetermined time interval, and wherein the at least one LED is scanned across the display between a start and end position throughout the duration of the predetermined time interval.

28. The timer of claim 27, wherein the eating and resting intervals are communicated to the subject via an audible source.

29. The timer of claim 28, wherein the audible source comprises: a series of tones each tone within the series denoting an eating and/or resting interval.

30. The timer of claim 28, wherein the audible source comprises: a voice synthesizer, the voice synthesizer being configured to deliver a set of messages delimitating the eating and/or resting intervals.

\* \* \* \* \*